United States Patent
Fukui

(10) Patent No.: US 6,246,063 B1
(45) Date of Patent: Jun. 12, 2001

(54) RADIATION IMAGE STORAGE PANEL

(75) Inventor: Shinichiro Fukui, Kanagawa (JP)

(73) Assignee: Fuji Photo Film Co., Ltd, Kanagawa (JP)

( * ) Notice: Subject to any disclaimer, the term of this patent is extended or adjusted under 35 U.S.C. 154(b) by 0 days.

(21) Appl. No.: 09/276,717

(22) Filed: Mar. 26, 1999

(30) Foreign Application Priority Data

Mar. 26, 1998 (JP) .................................................. 10-096923

(51) Int. Cl.⁷ .............................. G21K 4/00; G03B 42/02
(52) U.S. Cl. ....................................................... 250/484.4
(58) Field of Search ............................. 250/484.4, 484.2, 250/484.3, 581, 585, 588

(56) References Cited

U.S. PATENT DOCUMENTS

| | | | |
|---|---|---|---|
| 4,350,893 | * 9/1982 | Takahashi et al. | 250/484.1 |
| 4,733,090 | * 3/1988 | DeBoer et al. | 250/484.1 |
| 5,012,107 | * 4/1991 | Kano et al. | 250/484.4 |
| 6,031,236 | * 2/2000 | Arakawa et al. | 250/484.4 |
| 6,075,250 | * 6/2000 | Fukui et al. | 250/484.4 |

* cited by examiner

Primary Examiner—Constantine Hannaher
Assistant Examiner—Albert Gagliardi
(74) Attorney, Agent, or Firm—Birch, Stewart, Kolasch & Birch, LLP

(57) ABSTRACT

In a radiation image storage panel having a stimulable phosphor layer of a stimulable phosphor, and a surface protective film, the surface protective film exhibits scattering with a scattering length of 5 to 80 $\mu$m observed at a main wavelength of stimulated emission from the stimulable phosphor.

9 Claims, No Drawings

RADIATION IMAGE STORAGE PANEL

FIELD OF THE INVENTION

The present invention relates to a radiation image storage panel employable in the radiation image recording and reproducing method utilizing a stimulable phosphor.

BACKGROUND OF THE INVENTION

As a method replacing a conventional radiography, a radiation image recording and reproducing method utilizing a stimulable phosphor was proposed and has been practically employed. The method employs a radiation image storage panel comprising a support and a stimulable phosphor layer (stimulable phosphor sheet) provided thereon, and comprises the steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (i.e., stimulated emission); photoelectrically detecting the emitted light to obtain electric signals; and reproducing the radiation image of the object as a visible image from the electric signals. The panel thus treated is subjected to a step for erasing a radiation image remaining therein, and then stored for the next recording and reproducing procedure. Thus, the radiation image storage panel can be repeatedly employed.

In the above method, a radiation image is obtainable with a sufficient amount of information by applying a radiation to the object at a considerably smaller dose, as compared with a conventional radiography using a combination of a radiographic film and radiographic intensifying screen. Further, the method is very advantageous from the viewpoints of conservation of resource and economic efficiency because the radiation image storage panel can be repeatedly used while the radiographic film is consumed for each radiographic process in the conventional radiography.

The radiation image storage panel employed in the above-described method has a basic structure comprising a support and a stimulable phosphor layer provided on one surface of the support. If the phosphor layer is self-supporting, the support may be omitted. The phosphor layer usually comprises a binder and stimulable phosphor particles dispersed therein, but it may consist of agglomerated phosphor with no binder. The phosphor layer containing no binder can be formed by deposition process or firing process. Further, the layer comprising agglomerated phosphor soaked with a polymer is also known.

The stimulable phosphor emits stimulated emission when excited with stimulating rays after having been exposed to a radiation such as X-rays. Accordingly, the radiation having passed through an object or radiated from an object is absorbed by the phosphor layer of the storage panel in proportion to the applied radiation dose, and a radiation image of the object is produced in the panel in the from of a radiation energy-stored image. The radiation energy-stored image can be released as stimulated emission by sequentially irradiating the storage panel with stimulating rays. The stimulated emission is then photoelectrically detected to give electric signals, so as to reproduce a visible image from the electric signals.

In general, a transparent film of polymer material is placed on the free surface (surface not facing the support) of the phosphor layer to keep the layer from chemical deterioration or physical shock. This surface protective film can be formed by various method, for example, by applying a solution of resin (e.g., cellulose derivatives, polymethyl methacrylate), by fixing a transparent resin film (e.g., a glass plate, a film of organic polymer such as polyethylene terephthalate) with adhesive, or by depositing inorganic materials on the phosphor layer.

In order to improve the quality (e.g., sharpness, graininess) of the resultant visible image, a radiation image storage panel having a protective film of a particular haze is proposed in Japanese Patent Provisional Publication No. 62 (1987)-247298. Further, the inventors proposed a storage panel having a new protective film (U.S. Ser. No. 09/050, 953, now allowed). The proposed film has a multi-layered structure comprising a plastic film and a fluorocarbon resin layer containing light-scattering fine particles.

The radiation image recording and reproducing method is very useful for obtaining a radiation image as a visible image, and it is desired for the radiation image storage panel employed in the method to have a high sensitivity and give an image of high quality (such as high sharpness and high graininess).

The radiation image storage panel is repeatedly used in the cyclic procedure comprising the steps of: exposing to a radiation (for recording of a radiation image), irradiating with stimulating rays (for reading of the recorded image), and exposing to an erasing light (for erasing the remaining image). In this procedure, the storage panel is transferred from one step to another by means of conveying means such as belt and rollers in the radiation image recording and reproducing apparatus, and after a cycle of the steps is conducted, the storage panel is piled up on other storage panels and stored for next cycle. Since the surface of the storage panel is directly brought into contact with the conveying means (e.g., belt and rollers), stains and abrasions are liable to be produced. The stains and abrasions thus produced on the protective film disturb passage of the stimulating ray and/or the stimulated emission, and consequently depress the resultant image quality. For this reason, the surface of the panel has to have enough durability to resist the stains and abrasions.

Hitherto, the sharpness of resultant image has been thought to be improved by thinning the protective film. The thin protective film, however, often cannot satisfactorily protect the panel from the stains and abrasions, and hence the storage panel with the thin protective film generally has unsatisfactory durability. In order to solve this problem, various protective films were proposed. For example, a material having both high transparency and enough strength (e.g., polyethylene terephthalate) can be employed, or some kinds of resins can be used in combination. Further, a protective film having a multi-layered structure is also known.

Those known protective films have been developed in consideration of protection of the stimulable phosphor layer from chemical and physical deterioration (e.g., scratch resistance, stain resistance and abrasion resistance), as well as sharpness of the resultant image. However, although those protective films are improved to a certain extent, their properties should be more improved.

SUMMARY OF THE INVENTION

It is an object of the present invention to provide a radiation image storage panel having high surface durability and giving an image of high sharpness with high sensitivity.

The inventors studied to achieve the object, and finally have found that the protective film showing light-scattering in a particular degree can improve the sharpness. On the basis of this finding, the inventors have succeeded in preparing a radiation image storage panel which has a protective film having an enough thickness but which can give an image of high sharpness.

The present invention resides in a radiation image storage panel having a phosphor layer comprising a stimulable phosphor, and a surface protective film provided thereon, wherein the surface protective film exhibits scattering with a scattering length of 5 to 80 µm observed at a main wavelength of stimulated emission from the stimulable phosphor.

The scattering length is used to indicate a mean distance in which light travels straight until it is scattered, and hence a small value of scattering length means that the light is highly scattered. In accordance with Kubeluka-Munk theory, the scattering length can be calculated form the data obtained in the following measurement.

First, three film samples are prepared. Each film sample has a different thickness, but consists of the same components as the surface protective film sample. The thickness (µm) and the diffuse transmittance (%) of each sample are measured. The diffuse transmittance (%) can be measured by means of a spectrophotometer equipped with an integrating sphere. In the below-described examples of the present specification, an automatic recording spectrophotometer (U-3210, manufactured by HITACHI, Ltd.) equipped with an integrating sphere of 150 φ (150-0901) was used. The diffuse transmittance is measured at a wavelength corresponding to the main peak of the stimulated emission from the phosphor contained in the phosphor layer on which the surface protective film sample is provided.

From the thickness (µm) and the diffuse transmittance (%) obtained in the above measurement, the scattering length is calculated in accordance with the following formula (A) derived from Kubeluka-Munk theory. (The following formula (A) can be easily derived, under the boundary condition of the diffuse transmittance (%), from the formulas 5.1.12 to 5.1.15 described in "Keikotai Handbook [in Japanese, Handbook of Phosphor]", published by Ohm-sha, 1987, pp. 403.)

Formula (A):

$$T/100 = 4\beta/[(1+\beta)^2 \cdot exp(\alpha d) - (1-\beta)^2 \cdot exp(-\alpha d)]$$

in which T represents the diffuse transmittance (%), d represents the thickness (µm), and α and β are defined by the formulas: $\alpha = [K \cdot (K+2S)]^{1/2}$ and $\beta = [K/(K+2S)]^{1/2}$, respectively.

Into the formula (A) is incorporated the measured T (diffuse transmittance) and d (thickness) of each film sample, and thereby the values of K and S are determined. The scattering length (µm) and the absorption length (µm) described hereinafter are values defined by 1/S and 1/K, respectively.

Preferred embodiments of the present invention are as follows.

(1) The scattering length is in the range of 10 to 70 µm.
(2) The surface protective film comprises light-scattering fine particles dispersed in a resin.
(3) The light-scattering fine particles have a refractive index of at least 1.6 and a particle size of 0.1 to 1.0 µm.
(4) The light-scattering fine particles have a refractive index of at least 1.9 and a particle size of 0.1 to 0.5 µm.
(5) The surface protective film contains light-scattering fine particles in an amount of 0.5 to 10 wt. %.
(6) The surface protective film has a thickness of 3.5 to 10 µm.
(7) The resin in the protective film is a fluororesin or a fluorocarbon resin.
(8) The surface protective film further contains a dispersing agent.

DETAILED DESCRIPTION OF THE INVENTION

The radiation image storage panel of the invention is now described in detail.

The support employed in the invention can be optionally selected from those employed in the conventional radiation image storage panels. On the phosphor layer-side surface of the support, one or more auxiliary layers (e.g., light-reflecting layer containing light-reflecting material such as titanium dioxide, light-absorbing layer containing light-absorbing material such as carbon black, adhesive layer comprising polymer material such as gelatin) may be provided, if desired, for improving sensitivity or image quality (sharpness, graininess) or for enhancing bonding strength between the support and the phosphor layer. Further, for improving the sharpness of the resultant image, fine concaves or convexes may be formed on the phosphor layer-side surface of the support (or on the phosphor layer-side surface of the auxiliary layer, if it is provided). If the phosphor layer is self-supporting, the support may be omitted.

On the support, a phosphor layer comprising a stimulable phosphor is provided. As the stimulable phosphor, preferred is a phosphor giving a stimulated emission of a wavelength in the range of 300 to 500 nm when irradiated with stimulating rays of a wavelength in the range of 400 to 900 nm. In Japanese Patent Provisional Publications No. 2(1990)-193100 and No. 4(1992)-310900, examples of the stimulable phosphor are described in more detail. Examples of the preferred phosphors include divalent europium or cerium activated alkaline earth metal halide phosphors (e.g., BaFBr:Eu, BaFBrI:Eu), and cerium activated oxyhalide phosphors. Needless to say, those examples by no means restrict the invention, and other stimulable phosphors can be employed for the invention.

A typical stimulable phosphor layer in the invention comprises a binder resin and stimulable phosphor particles dispersed therein, and hence the radiation image storage panel of the invention having that phosphor layer is explained below.

The phosphor layer can be formed, for example, in the following known manner. First, the phosphor particles are uniformly dispersed in an organic solution of binder resin to prepare a coating liquid. The ratio between the binder and the phosphor in the solution depends on the characteristics of the phosphor and the desired property of the storage panel, but generally they are employed in the ratio of 1:1 to 1:100 (binder:phosphor, by weight), preferably 1:8 to 1:40.

Thus prepared coating liquid is coated on the support by known coating means (such as doctor blade, roll coater, and knife coater), and then dried to form a stimulable phosphor layer. The thickness of the phosphor layer is determined according to the characteristics of the phosphor, the desired property of the radiation image storage panel, and the mixing ratio of binder and phosphor, but generally in the range of 20 µm to 1 mm, preferably 50 µm to 500 µm.

The phosphor layer may be formed by other steps, namely, applying the above coating liquid onto a temporary support (e.g., glass plate, metal plate, plastic sheet), drying the applied liquid to form a phosphor layer, peeling off the phosphor layer, and then providing the phosphor sheet with an adhesive or by pressing onto the final support.

The stimulable phosphor layer may consist of agglomerated phosphor with no binder. Further, the phosphor layer comprising agglomerated phosphor soaked with a polymer is also employable.

On the phosphor layer, the surface protective film having the specific characteristic is formed. The protective film exhibits scattering with the scattering length of 5 to 80 μm (preferably 10 to 70 μm) observed at a main wavelength of stimulated emission from the stimulable phosphor contained in the phosphor layer. Preferably, the protective film contains light-scattering fine particles dispersed in a resin. The particles preferably have a particle size of 0.1 to 1.0 μm (more preferably 0.1 to 0.5 μm) and a refractive index of not less than 1.6 (more preferably not less than 1.9). Examples of the light-scattering fine particles include fine particles of magnesium oxide, zinc oxide, zinc sulfide, titanium dioxide, niobium oxide, barium sulfate, lead carbonate, silicon oxide, polymethyl methacrylate, styrene and melamine. Preferred are zinc oxide, zinc sulfide, titanium dioxide and lead carbonate, and particularly preferred is titanium dioxide.

The binder employable for the protective film is not specifically restricted. Examples of the binder materials include polyethylene terephthalate, polyethylene naphthalate, polyamide, aramid, and fluororesin (fluorocarbon resin). Preferred is an organic solvent-soluble fluorocarbon resin, which is a polymer of fluoro-olefin (olefin containing fluorine) or a copolymer comprising fluoro-olefin component. Examples of the fluorocarbon resin include poly (tetrafluoroethylene), poly (chlorotrifluoroethylne), polyvinyl fluoride, polyvinylidene fluoride, copolymer of tetrafluoroethylene and hexafluoropropylene, and copolymer of fluoro-olefin and vinyl ether. The fluorocarbon resin may be used in combination with other resins described above, and may contain an oligomer having polysiloxane structure or perfluoroalkyl group. Further, the fluororesin may be crosslinked with a crosslinking agent.

The surface protective film can be formed by the steps of dispersing the light-scattering particles in an organic solution of the binder resin to prepare a coating liquid, applying the liquid onto the phosphor layer directly or via a desired auxiliary layer, and then drying the applied liquid to form the protective film. The surface protective film may be formed by other steps, for instance, applying the coating liquid onto a temporary support, drying the applied liquid to form a protective film, peeling off the protective film from the temporary support, and then providing the protective film with an adhesive onto the phosphor layer directly or via a desired auxiliary layer. The protective film generally contains the light scattering particles in an amount of 0.5 to 10 wt. %, preferably 0.5 to 5 wt. %. For improving dispersibility, the light scattering particles may be beforehand subjected to surface treatment and the film may contain known dispersing agents (e.g., surface active agent type, titanate coupling agent type, aluminate coupling agent type) and/or other various additives such as silicon surface active agent and fluorine surface active agent. The thickness of the protective film generally is in the range of 1 to 20 μm, preferably 3.5 to 10 μm.

The absorption length (which indicates a mean distance in which light travels straight until it is absorbed) of the surface protective film is not restricted. From the viewpoint of sensitivity, it is preferred for the protective film not to absorb light. However, in order to make up for light shortage caused by the scattering, the surface protective film may be made to slightly absorb the light. The absorption length preferably is longer than 800 μm, more preferably longer than 1,200 μm.

The radiation image storage panel of the invention may have any one of various known structures. For example, at least one of the layers may be colored with a colorant which does not absorb the stimulated emission but the stimulating rays.

[EXAMPLE 1]

(I) Production of Radiation Image Storage Panel 1) 200 g of stimulable phosphor (BaFBr$_{0.85}$I$_{0.15}$:0.001 Eu$^{2+}$), 8.0 g of polyurethane resin (Pandex T5265M, trade name, available from Dainippon Ink & Chemicals, Inc.), and 2.0 g of epoxy resin (anti-yellowing agent, Epikote 1001, trade name, available from Yuka Shell Epoxy Kabushiki Kaisha) were added to methyl ethyl ketone, and mixed by means of a propeller mixer to prepare a coating liquid having a viscosity of 30 PS (at 25° C.). The prepared coating liquid was applied onto a temporary support (polyethylene terephthalate sheet having a surface beforehand coated with silicone-releasing agent) of 150 μm thickness, and dried to form a phosphor layer. The phosphor layer thus formed was then peeled off from the temporary support to give a stimulable phosphor sheet (thickness: 430 μm).

2) Independently, 90 g (in terms of solid content of soft acrylic resin and 50 g of nitrocellulose were added to methyl ethyl ketone, and mixed to prepare a coating dispersion for subbing layer [viscosity at 25° C.: 3–6 PS]. On a glass plate, a film of polyethylene terephthalate (support) was placed. The dispersion was then coated on the polyethylene terephthalate film by means of a doctor blade to form a layer of 15 μm thick, and gradually heated from 25° C. to 100° C. Thus, the coated layer was dried to form a subbing layer on the support.

3) The above-prepared phosphor sheet was placed on the subbing layer, and then continuously pressed with heating by means of a calender roll under a pressure of 500 kgw/cm$^2$ (temperature of the upper and lower rolls: 45° C., moving speed: 0.3 m/minute). By this pressing procedure, the phosphor sheet was fixed onto the transparent support via the subbing layer. Thus, a stimulable phosphor layer (thickness: 230 μm) is formed.

4) 70 g of fluorocarbon resin (copolymer of fluoro-olefin and monovinyl ether, Lumiflon LF504X, trade name, available from Asahi Glass Co., Ltd.), 5.2 g of isocyanate (crosslinking agent, Sumidule N3500, trade name, available from Sumitomo Bayer Urethane Co., Ltd.), 6.7 g of silicon resin (lubricating agent, X-22-2809, trade name, available from The Shin-Etsu Chemical Co., Ltd.), 0.3 g of dibutyltin laurate (catalyst, KS-1269, trade name, available from Kyodo Chemical Co., Ltd.), 2.8 g of light-scattering particles (anatase type titanium dioxide, A220, trade name, available from Ishihara Industries Co., Ltd., mean particle size: 0.15 μm, refractive index: about 2.6) and 0.12 g of titanate type coupling agent (Plane-act AL-M, trade name, available from Ajinomoto Co., Inc.) were added to methyl ethyl ketone, and mixed to prepare a coating liquid (solid content: 12%). The coating liquid was then applied onto the phosphor layer by means of a doctor blade, and dried to form a surface protective film of approximately 7 μm thick.

The content of titanium dioxide in the protective film was found to be 3 wt. %.

(II) Calculation of Scattering Length and Absorption Length of Surface Protective Film The coating liquid of the 4) above was applied onto a transparent support (thickness: 180 μm) so that the formed layer might have a thickness of 5 to 50 μm. The diffuse transmittance (%) of the formed layer was measured at wavelength of 400 nm (which corresponds to the main peak of the stimulated emission which was emitted from the aforementioned $BaFBR_{0.85}I_{0.15}{:}0.001Eu^{2+}$ phosphor), by means of an automatic recording spectrophotometer (U-3210, manufactured by HITACHI, Ltd.) equipped with integrating sphere of 150 φ (150-0910). The results are set forth in Table 1.

TABLE 1

| thickness (μm) | 7 | 11 | 24 | 40 |
|---|---|---|---|---|
| diffuse transmittance (%) | 70.3 | 62.6 | 48.4 | 40.2 |

In accordance with the aforementioned formulas, the values of K and S were calculated from the data shown in Table 1. From the calculated values of K and S, the scattering length and the absorption length were calculated to be 23 μm (scattering length=1/S) and 10,000 μm (absorption length=1/K), respectively.

[EXAMPLE 2]

The procedures of Example 1 were repeated except that 0.9 g of titanium dioxide was added to the coating liquid for the preparation of a protective film, to prepare a radiation image storage panel of the invention.

[EXAMPLE 3]

(I) Production of Radiation Image Storage Panel

A radiation image storage panel was prepared in the manner as described in Example 1, except that the protective film was replaced with the following two-layered protective films.

1) Lower protective film (Protective film I)

70 g of fluorocarbon resin (copolymer of fluoro-olefin and monovinyl ether, Lumiflon LF504X, trade name, available from Asahi Class Co., Ltd.), 5.2 g of isocyanate (crosslinking agent, Sumidule N3500, trade name, available from Sumitomo Bayer Urethane Co., Ltd.), 0.3 g of dibutyltin laurate (catalyst, KS-1269, trade name, available from Kyodo Chemical Co., Ltd.), 2.8 g of light-scattering particles (anatase type titanium dioxide, A220, trade name, available from Ishihara Industries Co., Ltd., mean particle: 0.15 μm, refractive index: about 2.6) and 0.12 g of titanate type coupling agent (Plane-act AL-M, trade name, available from Ajinomoto Co., Inc.) were added to methyl ethyl ketone, and mixed to prepare a coating liquid (solid content: 12%). The coating liquid was then applied onto the phosphor layer by means of a doctor blade, and dried to form a protective film I of approximately 2 μm thick.

2) Upper protective film (Protective film II)

50 g of fluorocarbon resin (copolymer of fluoro-olefin and vinyl ether, Lumiflon LF100, trade name, available from Asahi Glass Co., Ltd., 50 wt. % xylene solution), 5 g of isocyanate (crosslinking agent, Colonate HX, trade name, available from Nippon Polyurethane Co., Ltd.), 0.5 g of silicon resin (lubricating agent, X-22-2809, trade name, available from The Shin-Etsu Chemical Co., Ltd., solid content: 66 wt. %), 0.0004 g of dibutyltin laurate (catalyst, KS-1260, trade name, available from Kyodo Chemical Co., Ltd.), 6 g of light-scattering particles (benzoguanamine resin particles, Epostar s6, trade name, available from Japan Catalyst Co., Ltd.; mean particle size: 6, refractive index: about 1.6), and 0.1 g of titanate type coupling magnet (Plane-act AL-M, trade name, available from Ajinomoto Co., Inc.) were added to methyl ethyl ketone, and mixed to prepare a coating liquid. The coating liquid was then applied onto the protective film I by means of a doctor blade, and heated to 120° C. for 20 minutes to dry and thermally treat the coated liquid to form a protective film II of approximately 7 μm thick. Accordingly, the combination of the protective film I and the protective film II (total thickness: 9 μm was provided on the phosphor layer.

(II) Calculation of Scattering Length and Absorption Length of Combined Protective Films The coating liquid for the protective film II was applied onto each of the transparent supports having protective films of different thickness (which were prepared in Example 1-(II), to have 2 μm thick. The diffuse transmittance (%) of the formed layer was measured in the same manner as described in Example 1-(II).

[COMPARISON EXAMPLE 1]

The procedures of Example 1 were repeated except that titanium dioxide and the coupling agent were not added to the coating liquid for protective film, to prepare a radiation image storage panel for comparison having a protective film of approximately 7 μm thick.

[COMPARISON EXAMPLE 2]

The procedures of Example 1 were repeated except that titanium dioxide and the coupling agent were not added to the coating liquid for protective film, to prepare a radiation image storage panel for comparison having a protective film of approximately 3.5 μm thick.

[EVALUATION OF RADIATION IMAGE STORAGE PANEL]

With respect to sensitivity, sharpness and durability, each radiation image storage panel prepared above was evaluated in the following manners.

(1) Measurement of sensitivity

After the sample storage was exposed to X-rays (generated under 80 kVp), the stimulable phosphor was excited with He-Ne laser (wavelength: 632.8 nm). The stimulated emission produced from the panel was detected, and the sensitivity was evaluated from the relative intensity of the emission.

(2) Measurement of sharpness

After the sample storage panel was exposed to X-rays (generated under 80 kVp) through an MTF chart, the stimulable phosphor was excited with He-Ne laser (Wavelength: 632.8 nm). The stimulated emission produced from the storage panel was detected by a photomultiplier tube (S-5) to convert into electric signals. On the basis of the obtained signals, the radiographic image was reproduced on a display of an image-reproducing apparatus. The MTF (modulation transfer function) of the reproduced radiographic image was determined (spatial frequency: 2 cycle/mm).

(3) Measurement of durability

The storage panel was cut into pieces (size: 100 mm ×250 mm), and one of them was repeatedly subjected to the durability test [described in Japanese Patent Provisional Publication No. 8(1996)-36099] until cracks appeared on the surface of the protective film. From the repeated number of the test, the durability of the panel was evaluated.

The results are set forth in Table 2.

TABLE 2

| panel | Ex. 1 | Ex. 2 | Ex. 3 | C. Ex. 1 | C. Ex. 2 |
|---|---|---|---|---|---|
| particles (wt. %) | 3 | 1 | 3 (20) | 0 | 0 |
| film thickness ($\mu$m) | 7 | 7 | 2 (7) | 7 | 3.5 |
| scattering length ($\mu$m) | 23 | 50 | 49 | >200 | >200 |
| relative sensitivity | 99 | 100 | 98 | 100 | 100 |
| sharpness (%) | 38.0 | 36.9 | 37.1 | 36.5 | 38.2 |
| durability (times) | >4,000 | >4,000 | >4,000 | >4,000 | 2,000 |

Remarks: The value in the parenthesis of Ex. 3 is the value of the protective film II.

The results set forth in Table 2 indicate the following facts. The radiation image storage panels of the invention (Examples 1, 2 and 3) give images of high sharpness while they have almost the same sensitivity and durability as the conventional radiation image storage panel (Comparison Example 1). Further, the conventional storage panel having a thin protective film (Comparison Example 2) gives high sharpness but shows apparently poor durability.

What is claimed is:

1. A radiation image storage panel having a phosphor layer of a stimulable phosphor, and a surface protective film provided thereon, wherein the surface protective film exhibits scattering with a scattering length of 5 to 80 $\mu$m observed at a main wavelength of stimulated emission from the stimulable phosphor.

2. The radiation image storage panel of claim 1, wherein the scattering length is in the range of 10 to 70 $\mu$m.

3. The radiation image storage panel of claim 1, wherein the surface protective film comprises light-scattering fine particles dispersed in a resin.

4. The radiation image storage panel of claim 3, wherein the light-scattering fine particles have a refractive index of at least 1.6 and a particle size of 0.1 to 1.0 $\mu$m.

5. The radiation image storage panel of claim 4, wherein the light-scattering fine particles have a refractive index of at least 1.9 and a particle size of 0.1 to 0.5 $\mu$m.

6. The radiation image storage panel of claim 3, wherein the surface protective film contains light-scattering fine particles in an amount of 0.5 to 10 wt. %.

7. The radiation image storage panel of claim 1, wherein the surface protective film has a thickness of 3.5 to 10 $\mu$m.

8. The radiation image storage panel of claim 3, wherein the resin is a fluororesin.

9. The radiation image storage panel of claim 1, wherein the surface protective film further contains a dispersing agent.

* * * * *